United States Patent

Musch et al.

[11] Patent Number: 5,694,688
[45] Date of Patent: *Dec. 9, 1997

[54] METHOD AND APPARATUS FOR MAKING PAINT ROLLER COVER

[75] Inventors: Gordon F. Musch, West Salem; Serafin J. Gerardo, Mansfield; Dennis D. Humphrey; Bruce E. Bochnak, both of Wooster; Richard L. Barker, Apple Creek; William J. Roberts, West Salem; Harold R. Young, Wooster, all of Ohio

[73] Assignee: The Wooster Brush Company, Wooster, Ohio

[*] Notice: The term of this patent shall not extend beyond the expiration date of Pat. No. 5,537,745.

[21] Appl. No.: 645,874

[22] Filed: May 14, 1996

Related U.S. Application Data

[63] Continuation of Ser. No. 381,541, Jan. 31, 1995, Pat. No. 5,537,745.

[51] Int. Cl.$^6$ .................................................. B23P 15/00
[52] U.S. Cl. ................................. 29/895.211; 29/895.21; 29/33 Q; 492/48
[58] Field of Search .................. 29/895.211, 895.21, 29/32 D, 33 Q; 492/48, 49; 15/230.11, 230.13

[56] References Cited

U.S. PATENT DOCUMENTS

| | | |
|---|---|---|
| 1,943,215 | 1/1934 | Dunlap. |
| 2,500,573 | 3/1950 | Rockoff. |
| 2,731,067 | 1/1956 | Miller. |
| 2,812,007 | 11/1957 | Touchett et al.. |
| 3,030,696 | 4/1962 | Serwer. |
| 3,229,351 | 1/1966 | Peterson et al.. |
| 4,191,792 | 3/1980 | Janssen. |
| 4,692,975 | 9/1987 | Garcia. |
| 5,137,595 | 8/1992 | Garcia. |
| 5,195,242 | 3/1993 | Sekar. |
| 5,206,968 | 5/1993 | Bower et al.. |
| 5,273,604 | 12/1993 | Garcia. |
| 5,397,414 | 3/1995 | Garcia et al.. |
| 5,398,409 | 3/1995 | Sekar. |

FOREIGN PATENT DOCUMENTS

WO9407679   4/1994   WIPO.

OTHER PUBLICATIONS

Himont Development Data Sheet (1 page) for "Polypropylene for High-Speed Extrusion Coating and Laminating", 1985, 1988.

Himont Product Data Sheet No. 510-2 (2 pages) for "Propylene Copolymers for High Extrudate Strength", 1985, 1988.

*Primary Examiner*—Irene Cuda
*Attorney, Agent, or Firm*—Renner, Otto, Boisselle & Sklar, P.L.L.

[57] ABSTRACT

A paint roller cover with thermoplastic core and method and apparatus for making same by spirally wrapping a strip of hot extruded thermoplastic film onto an exterior surface of hollow thermoplastic tubing and spirally wrapping a strip of fabric having a thermoplastic backing onto the spiral wound strip of thermoplastic film while the thermoplastic film is still sufficiently hot to cause the thermoplastic film to flow into interstices in the thermoplastic backing of the fabric and permanently bond the fabric to the exterior surface of the tubing. The fabric covered tubing is then cooled and separated into a plurality of individual lengths of fabric covered tubes.

23 Claims, 4 Drawing Sheets

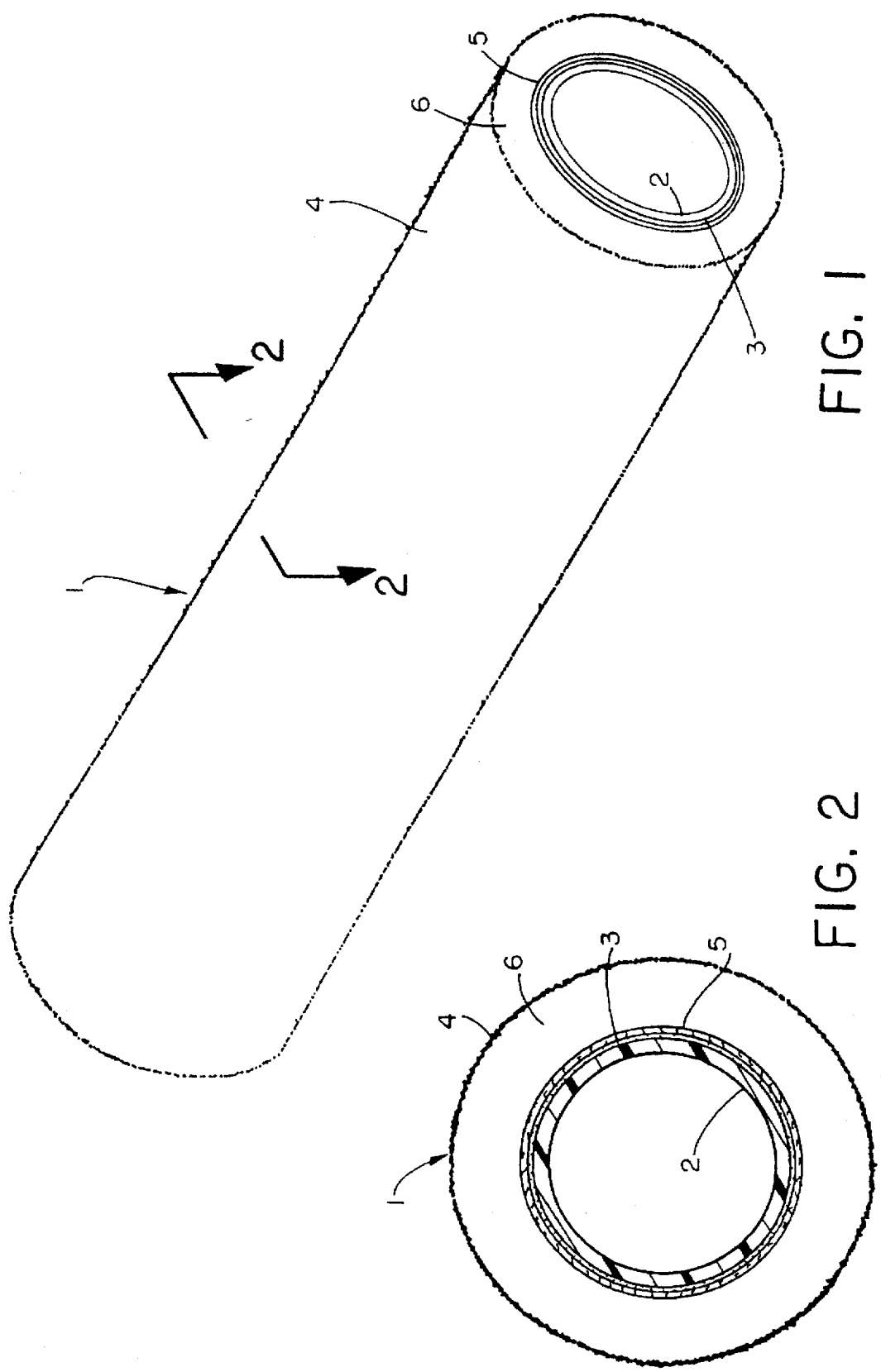

METHOD AND APPARATUS FOR MAKING PAINT ROLLER COVER

This is a continuation of application(s) Ser. No. 08/383,541 filed on Jan. 31, 1995, now U.S. Pat. No. 5,537,745.

FIELD OF THE INVENTION

The present invention relates to a roller cover and method and apparatus for making same by adhering a roller fabric to a thermoplastic tube by means of an extruded thermoplastic film that is spirally wrapped onto the tube immediately prior to the roller fabric.

BACKGROUND OF THE INVENTION

It is generally known to make paint roller covers with thermoplastic cores. Making the cores out of a thermoplastic material has the advantage that the cores will not delaminate even after prolonged soaking as is the case with most cardboard cores. However, there is still a problem with the roller fabric prematurely separating from thermoplastic cores, either because the adhesive does not provide a very effective bond between the fabric backing and cores, or the adhesive does not hold up after prolonged soaking in certain types of solvents.

SUMMARY OF THE INVENTION

The present invention relates to a paint roller cover which is completely impervious to water and most solvents, even after prolonged soaking. Also, the present invention relates to a novel method and apparatus for making such a roller cover.

In accordance with one aspect of the invention, the core is made of a thermoplastic material, and the roller fabric is permanently bonded to the core by means of a thermoplastic film that is completely impervious to water and most solvents, even after prolonged soaking.

In accordance with another aspect of the invention, the roller cover is made by spirally wrapping a strip of hot thermoplastic film onto an exterior surface of hollow thermoplastic tubing, spirally wrapping a strip of fabric having a thermoplastic backing onto the spiral wound strip of thermoplastic film while the thermoplastic film is still sufficiently hot to cause the thermoplastic film to flow into interstices in the thermoplastic backing of the fabric and bond the fabric to the exterior surface of the tubing, cooling the fabric covered tubing, and cutting the fabric covered tubing into a plurality of individual roller covers.

In accordance with another aspect of the invention, the apparatus that is used to make paint roller covers in accordance with the present invention includes means for spirally wrapping a strip of hot thermoplastic film onto the exterior surface of hollow thermoplastic tubing, means for spirally wrapping a strip of fabric having a thermoplastic backing onto the thermoplastic film while the thermoplastic film is still sufficiently hot to cause the thermoplastic film to flow into interstices in the thermoplastic backing and bond the fabric to the exterior surface of the tubing, means for cooling the fabric covered tubing, and means for separating the fabric covered tubing into a plurality of individual lengths of fabric covered tubes.

These and other objects, advantages, features and aspects of the present invention will become apparent as the following description proceeds.

To the accomplishment of the foregoing and related ends, the invention, then, comprises the features hereinafter fully described and particularly pointed out in the claims, the following description and the annexed drawings setting forth in detail a certain illustrative embodiment of the invention, this being indicative, however, of but one of the various ways in which the principles of the invention may be employed.

BRIEF DESCRIPTION OF THE DRAWINGS

In the annexed drawings:

FIG. 1 is an enlarged perspective view of a preferred form of paint roller cover made in accordance with the present invention;

FIG. 2 is an enlarged transverse section through the paint roller cover of FIG. 1, taken generally along the plane of the line 2—2 thereof;

DETAILED DESCRIPTION OF THE PREFERRED EMBODIMENT

Figure 3:
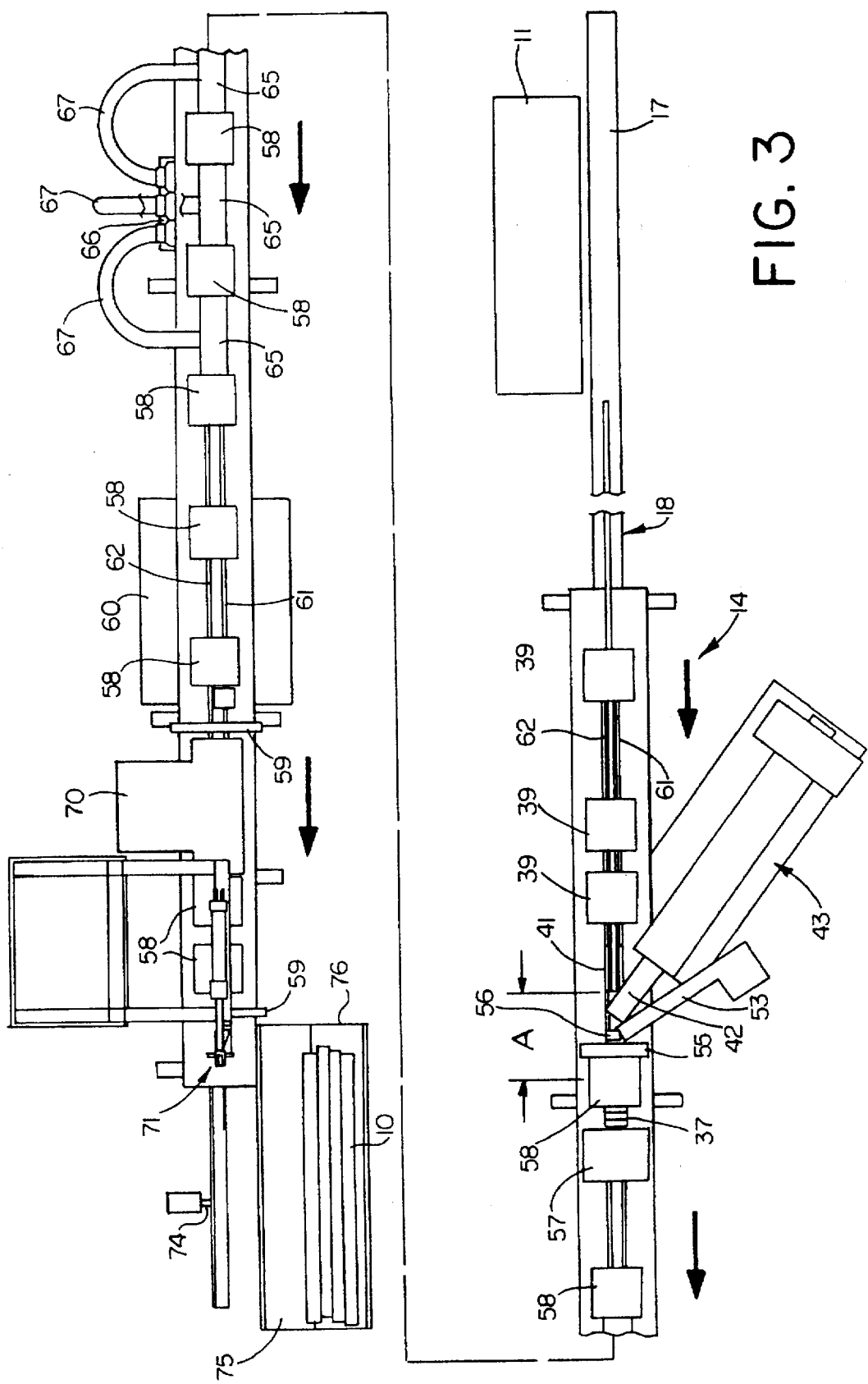
FIG. 3 is a schematic top plan view of a preferred form of apparatus for making such paint roller covers.

Referring now in detail to the drawings, and initially to FIGS. 1 and 2, a preferred form of paint roller cover in accordance with this invention is generally indicated at 1 and includes a tubular thermoplastic core 2 having a uniformly thick layer of bonding film 3 on the exterior surface thereof for permanently bonding a suitable fabric 4 to the core.

The core 2 may be made of any suitable crystalline or semi-crystalline polyolefin polymer such as natural and filled polypropylene and high density polyethylene. A presently preferred polyolefin polymer is a polypropylene copolymer comprising anywhere from approximately 90 to 96% polypropylene and 4 to 10% ethylene monomer, with approximately 93% polypropylene and 7% ethylene monomer being preferred. Also, the polyolefin copolymer used for the core material desirably has a melt flow rate of between approximately 0.3 and 0.7 dg./min. Polypropylene has excellent chemical resistance to solvents and water and has an overall toughness. Ethylene monomer is added to the polypropylene in small amounts for higher impact strength, to allow the core to be subjected to low temperatures or sharp impacts without breakage, and for ease of extruding the material into the desired tubular shape and precisely cutting the tubing into the desired individual paint roller lengths.

The fabric 4 may be a conventional roller fabric that preferably has a heavy open weave thermoplastic backing 5 woven into the fabric to allow for a superior mechanical bond between the fabric backing and bonding film 3. The fabric pile or nap 6 may be made of different materials or blends and be of different heights depending on the particular application. The thermoplastic bonding film 3 should be compatible with both the core material and the fabric backing in order to achieve a permanent bond therebetween. In the case where the core material is a polypropylene copolymer, the bonding film is desirably made of polypropylene and the fabric backing is made of a compatible thermoplastic such as polyester or polypropylene. Also, the polypropylene bonding film desirably has a melt flow rate of between approximately 30 and 45 dg./min. with a melt flow rate of approximately 40 being preferred and with good melt strength, to allow the material to be extruded into a film of the desired thickness and width and spirally wrapped onto the tubular core material immediately prior to spirally wrapping the fabric onto the core material to permanently bond the fabric to the core material as described hereafter.

During the manufacturing process, hot bonding film 3 of the desired thickness and width is drawn from an extruder equipped with a coat hanger die and spirally wrapped around the extruded tubular core material 2. Within approximately one turn of wrapping the hot bonding film onto the tubular core material, a strip of the fabric material 4 having substantially the same width as the bonding film is spirally wrapped around the bonding film to permanently bond the fabric strip to the tubular core material.

In order to be able to spirally wrap the hot bonding film and fabric onto the exterior surface of the tubular core material and still maintain the desired tubular shape and integrity of the tubular core material, the tubular core material desirably has a wall thickness of between approximately 0.030 and 0.070 inch, with a thickness of approximately 0.060 inch being preferred. Also, the layer of bonding film on the tubular core material desirably has a thickness of between approximately 0.010 and 0.030 inch, with a thickness of approximately 0.020 inch being preferred, to ensure that there is enough bonding material and latent heat in the bonding material to allow the bonding material to flow into the interstices in the fabric backing and obtain the desired mechanical and chemical bond between the bonding film and fabric backing.

The first step in making paint roller covers in accordance with the present invention is to provide a supply of extruded tubes 10 of the thermoplastic core material cut to the desired length, for example, 65 inches. Before the fabric material is applied to the extruded tubes, the tubes are stored in a vertical position for a minimum length of time after manufacture, for example 24 hours, to give the tubes sufficient time to normalize, crystallize, shrink and stabilize.

After the tubes 10 have been stored for a sufficient length of time, they are loaded into a hopper 11, schematically shown in FIG. 3. Connected to the hopper 11 is a vertical conveyor 12 schematically shown in FIG. 4, for continuously feeding the tubes, one at a time, into a plastic tube spiralling machine/apparatus 14. As the tubes are continuously fed through the apparatus, the apparatus spirally wraps the bonding film and fabric onto the tubes and permanently bonds the fabric to the exterior surface of the tubes. Thereafter the fabric wrapped tubes are sufficiently cooled to permit them to be separated from each other and discharged from the apparatus as described hereafter.

The tubes 10 that are loaded into the hopper 11 are picked up by the vertical conveyor 12 (see FIG. 4) and discharged into a track 16 that feeds the tubes, one at a time, onto a trough assembly 17. From there the tubes 10 are pushed axially onto a floating tube mandrel 18 by a tube ram 19 that is movable axially along the length of the trough 17 from one end to the other.

The mandrel 18 supports the tubes 10 during the spiral wrapping of both the bonding film and fabric onto the tubes as described hereafter, and is desirably of considerable length, for example 195¼ inches, for supporting three 65 inch length tubes on the mandrel at any given time. Moreover, the mandrel desirably comprises a plurality of tubular sections made for example of extruded aluminum and suitably connected together at their ends.

Figure 4:
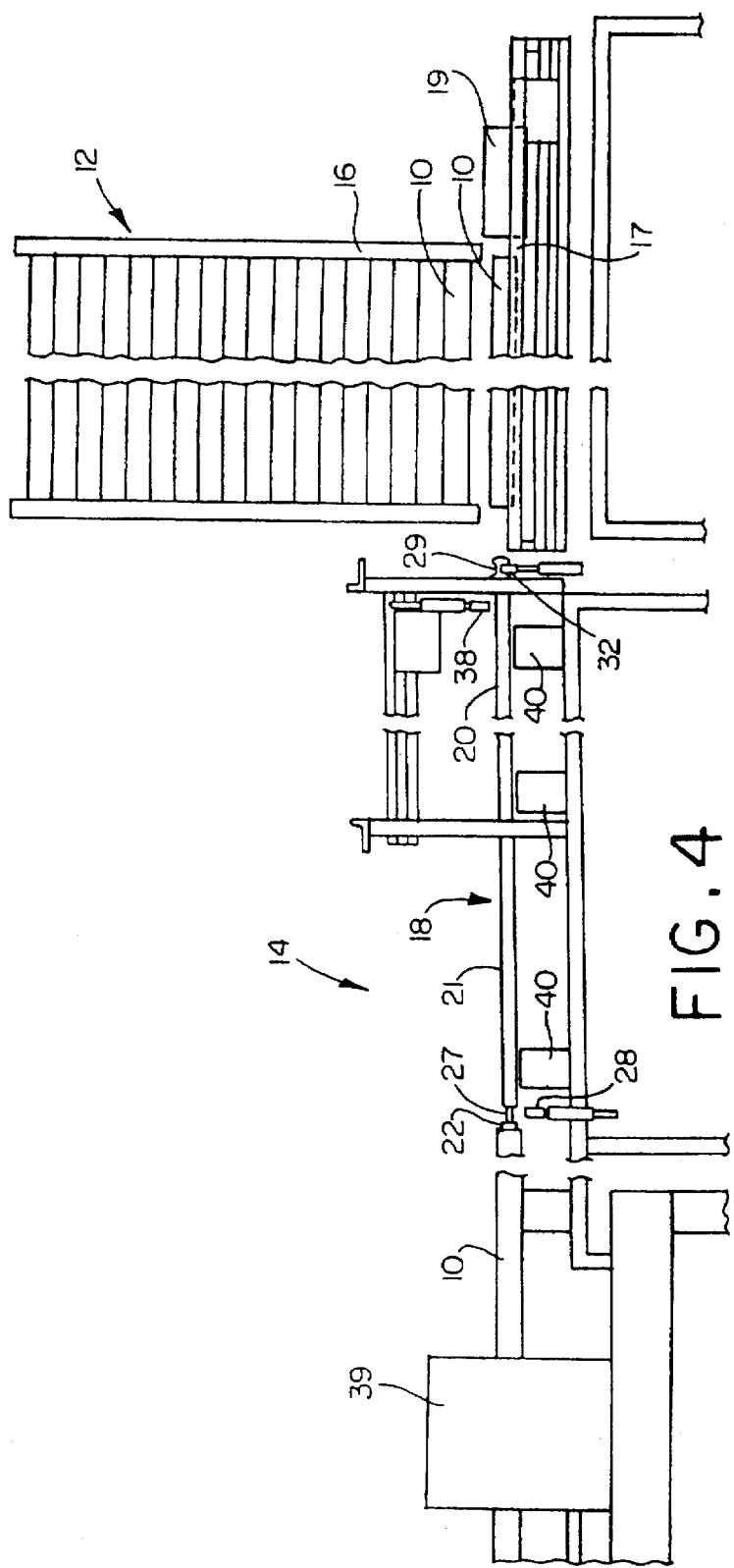
FIG. 4 is an enlarged schematic fragmentary side elevation view of the automatic tube feed mechanism of such apparatus.
Figure 5:
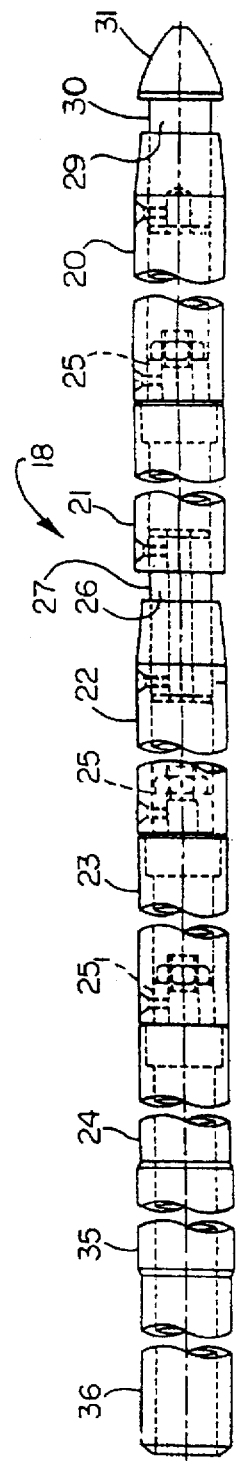
FIG. 5 is an enlarged fragmentary side elevation view of the mandrel used in such apparatus.

In the preferred embodiment disclosed herein, the mandrel 18 is made up of five sections 20–24 (see FIG. 5). The first two sections 20 and 21 (as viewed from the upstream end of the apparatus in the direction of the downstream end) have a length of approximately 37⅛ inches and 30⅜ inches, respectively (for a combined length of approximately 67½ inches), and are connected together at their ends by a bearing sleeve 25 that permits relative rotation between sections. The third section 22 has a length of approximately 33¾ inches and is connected to the second section 21 by a connector plug 26 that defines a notch or groove 27 between such sections for releasable engagement by a mandrel stop 28 (see FIG. 4) which when engaged prevents axial movement of the mandrel.

A similar notch or groove 29 is formed by the shaft 30 of a tube guide 31 extending into the upstream end of the first mandrel section 20 for releasable engagement by another mandrel stop 32.

The fourth and fifth mandrel sections 23 and 24 are each approximately 45¾ and 48¼ inches long, respectively, and are connected together and to the third section 22 by bearing sleeves 25 to provide rotatable connections therebetween, similar to the rotatable connection between the first two sections 20, 21.

The mandrel 18 terminates immediately downstream of the zone A (see FIG. 3) of the apparatus 14 at which the bonding film 3 and fabric 4 are spirally wrapped onto the tubing 10. Moreover, the mandrel 18 desirably includes a stepped portion 35 in this zone or area A having a greater outer diameter than the remaining length of the mandrel to bring the mandrel to a size that more closely matches the inner diameter of the tubes to provide better support for the tubes at the critical point where the bonding film and fabric are applied to the tubes. This stepped portion 35 of the mandrel may, for example, have an outer diameter of approximately 1.473 inches where the inner diameter of the raw tubes 10 is approximately 1.5 inches and an axial length of approximately 13 inches. The outer diameter of the remaining length of the mandrel including a 6 inch length 36 at the downstream-most end of the mandrel is desirably somewhat less, for example, approximately 1.437 inches, to provide a greater clearance between the outer diameter of the mandrel and inner diameter of the tubes over the majority of the length of the mandrel to reduce the drag on the tubes when the tubes are driven both rotationally and axially relative to the mandrel by planetary drive assemblies as described hereafter.

In order to be able to push the tubes 10 onto the first two mandrel sections 20, 21 by the tube ram 19, the upstream mandrel stop 32 must be disengaged from the mandrel 18 so as not to interfere with the tube movement onto such mandrel sections. At the same time, the downstream mandrel stop 28 should engage the mandrel to prevent the mandrel from moving axially. If the two mandrel stops 28, 32 should ever be simultaneously disengaged from the mandrel, the mandrel may start to travel down the line, in which event a metal detector 37 located immediately downstream of the bonding film and fabric application zone A (see FIG. 3) will sense the mandrel movement and automatically shut the apparatus down to prevent any damage to the apparatus further downstream of the metal detector.

Once a tube 10 is slid into place on the first two mandrel sections 20, 21, the upstream mandrel stop 32 is engaged and the downstream mandrel stop 28 is disengaged to permit a tube stripper 38 to engage the trailing (upstream) end of the tube and push the tube axially downstream onto the third mandrel section 22 where the tube is engaged by one of several planetary drive assemblies 39 that propel the tubes both axially and rotationally through the apparatus.

After the trailing end of a tube 10 clears the downstream mandrel stop 28, the downstream mandrel stop 28 is reengaged and the upstream mandrel stop 32 is disengaged to permit the next tube 10 to be pushed onto the first two mandrel sections 20, 21. Thereafter the upstream mandrel stop 32 is reengaged and the downstream mandrel stop 28 is disengaged to permit the next length of tube to be pushed onto the third mandrel section 22 and into abutting engagement with the trailing end of the previous tube, and so on. Two such tubes 10 are schematically shown in butting end to end engagement with each other in FIG. 6.

A plurality of axially spaced apart tube support rollers 40 support the mandrel sections 20, 21 and 22 and surrounding tubes 10 upstream of the first planetary drive assembly 39 (see FIG. 4).

Figure 6:
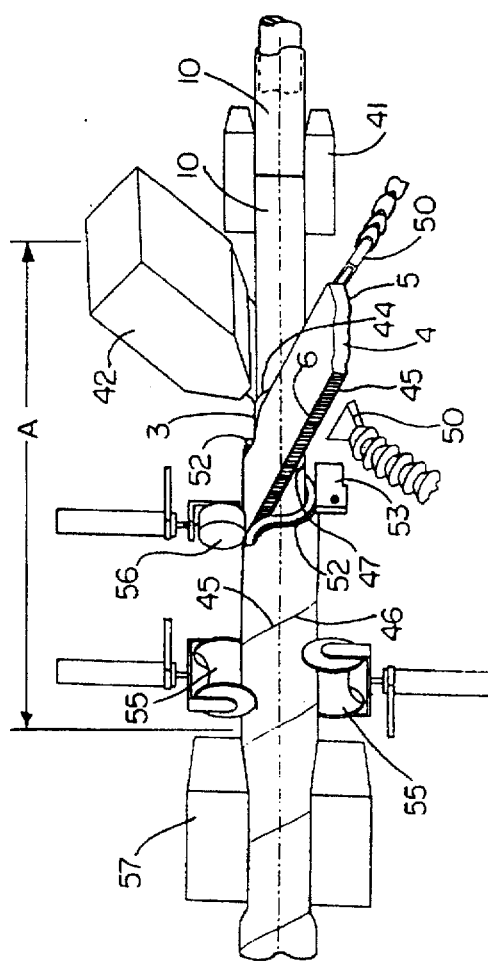
FIG. 6 is an enlarged schematic side elevation view of the portion of the apparatus at which the bonding film and fabric are spirally wrapped onto the tubular core material.

Immediately upstream of the fabric and bonding film application zone A are a series of alignment rollers 41 through which the tubing passes just prior to spirally wrapping the bonding film and fabric strip material onto the tubing (see FIGS. 3 and 6). As the rotating and axially advancing tubing passes through the fabric and bonding film application zone A, hot bonding film 3 is laid down on the exterior surface of the tubing at a desired helix angle by the die head 42 of an extruder 43 equipped with a coat hanger die as aforesaid. The axial and rotational movement of the tubing causes the bonding film 3 to be spirally wrapped onto the tubing with the side edges 44 of the bonding film in close butting engagement with each other (see FIG. 6) while a constant tension is applied to the bonding film to obtain the desired uniform thickness and width of bonding film on the tubing.

Within approximately the next turn of the bonding film, a fabric strip 4 having substantially the same width as the bonding film is spirally wrapped onto the bonding film at substantially the same helix angle as the bonding film and with the side edges 45 of the fabric strip also in close abutting engagement with each other.

In one form of the invention, where the tubing 10 is extruded out of a polypropylene copolymer having an inner diameter of approximately 1.5 inch and a wall thickness of approximately 0.060 inch, and the fabric strip 4 has a width of approximately 2⅞ inches and a heavy open weave backing 5 made of a compatible thermoplastic material, a polypropylene bonding film 3 is drawn down from a width of approximately 4 inches and a thickness of approximately 0.057 inch at the extruder die opening to a width of approximately 2¾ inches and film thickness of approximately 0.020 inch as the bonding film is spirally wrapped onto the tubing. When the bonding film comes into contact with the tubing and as the fabric is spirally wrapped around the bonding film, the bonding film is still at a relatively high temperature, for example, between approximately 475° and 500° F. At this temperature, the latent heat in the bonding film is sufficient to cause the bonding film to flow into the interstices in the fabric backing and permanently bond the fabric to the tubing. Preferably, the fabric seams 46 are located between the bonding film seams 47 when the fabric is spirally wrapped onto the tubing.

The fabric 4 comes in various lengths, for example, 100 feet lengths. Accordingly, the ends of the fabric must be spliced together in order to provide a continuous supply of fabric to the tubing as the tubing is continuously advanced through the apparatus. As the fabric is spirally wrapped around the tubing/bonding film, a predetermined amount of tension is maintained on the fabric to ensure that the fabric is tightly wrapped around the tubing and the bonding film flows into the interstices in the fabric backing to provide a permanent bond between the fabric and tubing.

Air nozzles 50 (see FIG. 6) located adjacent the side edges of the fabric direct a flow of air against the fabric side edges to cause the fabric pile/nap 6 to stand up along the side edges. In addition, a helically shaped fabric guide 52 extends approximately 360° around the tubing at the same helix angle as the fabric edge and picks up the fabric pile/nap 6 on the entry/upstream side and terminates at the butt joint where the fabric edges come together. This helps to form the fabric into the desired curl with the edges of the fabric pile/nap standing up so the pile/nap does not get caught between or underneath the abutting fabric edges. The helical fabric guide 52 is supported by a mounting bracket 53 connected to the fabric guide on the underneath side thereof as schematically shown in FIG. 6.

A set of elliptically shaped rollers 55, which may either be spring or air operated, is located immediately downstream of where the fabric is spirally wrapped onto the tubing to apply a preset pressure across the entire width of the fabric to ensure an even, uniform adherence of the fabric to the tubing over substantially the entire surface area of the fabric. A third roller 56, which may also be air or spring actuated, is positioned right where the fabric seam 46 initially comes together to ensure uniform adherence of the fabric to the tubing along the fabric seam. This has the benefit that when the tubing is subsequently cut into individual paint roller lengths, if a cut should occur across a fabric seam, the edge of the fabric will not pull away from the tubing.

As previously indicated, the tubing is internally supported by the enlarged diameter stepped portion 35 of the mandrel 18 during the spiral wrapping of both the hot bonding film 3 and fabric 4 onto the tubing. Also, the spiral wrapped tubing is internally supported by the mandrel during the application of a preset pressure to the fabric by the seam roller 56 and elliptical rollers 55 immediately after the fabric is wrapped onto the tubing.

Beyond that point, the fabric covered tubing is no longer internally supported. Instead, the fabric covered tubing is only supported on the exterior by additional planetary drive assemblies 58 and roller guide assemblies 59 strategically located along the length of the apparatus downstream of the pressure rollers 55. In addition, a set of alignment rollers 57 for the fabric covered tubing are positioned downstream of the pressure rollers 55 which cooperate with the tube alignment rollers 41 immediately upstream of where the bonding film and fabric are spirally wrapped onto the tubing to assist in maintaining proper alignment of the tubing during application of the bonding film and fabric to the tubing.

All of the planetary drive assemblies 39 and 58 (i.e., those downstream of where the bonding film and fabric are applied to the tubing as well as those upstream thereof) are driven from a common power supply unit 60 by two input shafts 61, 62 (see FIG. 3), one of which controls the axial speed of the tubing, and the other of which controls the rotational speed. The ratio of these two speeds defines the helix angle at which the fabric (as well as the bonding film) is wrapped onto the tubing, which is critical in producing a good butt joint between adjacent fabric wraps. Should a gap start to develop between adjacent fabric wraps, this can be corrected simply by changing one of the speeds of the two input shafts 61, 62 to close the helix angle. Conversely, should an overlap start to develop between adjacent fabric wraps, this can be corrected by changing one of the speeds of the two input shafts 61, 62 to open the helix angle.

The planetary drive assemblies 58 downstream of where the bonding film and fabric are applied to the tubing may be substantially the same as the upstream planetary drive assemblies 39 except that the upstream planetary drive assemblies 39 include three sets of tires which engage the exterior surface of the tubing and propel the tubing both axially and rotationally, whereas the downstream planetary drive assemblies 58 include three sets of pinwheels which grip the fabric to propel the tubing both axially and rotationally.

After the fabric strip has been spirally wrapped and rolled onto the tubing, the temperature of the fabric covered tubing is still relatively hot, in the range of 350° to 400° F., which is too hot to separate the tubes 10 from each other by cutting through the fabric at the ends of the tubes. Preferably the tubes are cooled down to a temperature of no more than approximately 200° F. before the tubes are cut apart. Thus, it is important to cool the tubes down as rapidly as possible after the fabric strip is adhered to the tubes to maximize the production output of the apparatus.

In the preferred embodiment disclosed herein, cooling of the fabric covered tubing is accelerated by supplying cool/ air conditioned air to one or more manifolds 65 located between various planetary drive assemblies 58 downstream of where the fabric is applied to the tubing as schematically shown in FIG. 3. One or more air conditioning units 66 may be used to supply cool air through air ducts 67 to the same or different manifolds 65 as desired. The ends of the manifolds 65 are of course open to allow for unobstructed movement of the fabric covered tubing through the manifolds.

After the fabric covered tubing is sufficiently cooled, the tubing passes through a cutter assembly 70 (see FIGS. 3 and 7) that moves axially at the same lineal speed as the tubing for a very short distance, for example, approximately 1 inch, while making a cut through the fabric between the ends of the tubes.

Figure 7:
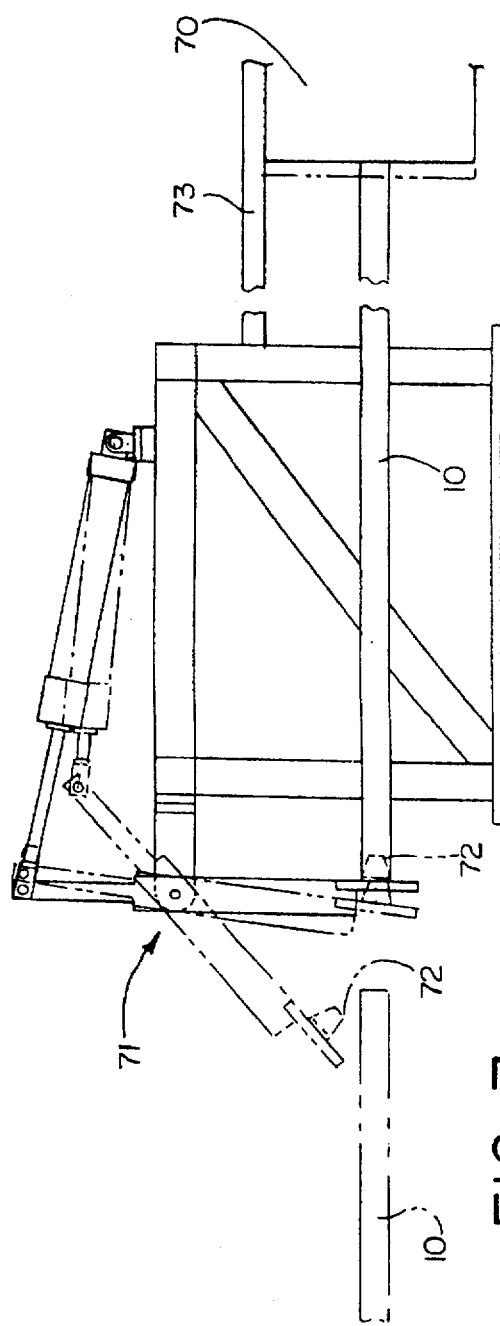
FIG. 7 is an enlarged schematic side elevation view of the cutter assembly and dead stop of such apparatus.

Operation of the cutter assembly 70 is controlled by a dead stop 71 which, as best seen in FIG. 7, includes a target 72 in coaxial alignment with the tubing downstream of the cutter assembly. The target 72 is spaced from the cutter mechanism 70 a distance corresponding to each individual length of tubing 10 (in this case 65 inches). Accordingly, when the downstream-most end of the tubing engages the target 72, both the dead stop 71 and cutter mechanism 70 which is tied to the dead stop through a tie rod assembly 73, are caused to move a very short distance, for example approximately 1 inch, during which the cutter blades move radially inward to cut through the fabric between a pair of tube ends.

After the dead stop 71 moves the short distance required for the cutter mechanism 70 to cut through the fabric between a pair of tube ends, the target 72 pivots out of the way above the tube that was just separated from the remaining tubing as schematically shown in phantom lines in FIG. 7 to permit the leading end of the separated tube to move past the target to the position also shown in phantom lines in FIG. 7 where the tube is free to be pushed sideways by an air actuated push rod 74 to cause the tube to be discharged down a chute 75 into a discharge hopper 76 (see FIG. 3).

As soon as the target 72 pivots out of the way, both the dead stop 71 and cutoff mechanism 70 move back to their original starting positions shown in solid lines in FIG. 7. Also, as soon as the separated tube 10 has been discharged onto the discharge chute 75, the target 72 repositions itself for reengagement by the leading end of the next length of tubing and the cutting cycle is repeated.

While the lengths of tubes 10 are in the discharge hopper 76, both ends of the tubes may be inspected for any possible types of defects. Following inspection, the tubes are taken out of the hopper and stacked on end until the fabric covered tubes are uniformly cooled throughout their length. It is important to cool the tubes at a uniform rate over their entire length while the tubes are standing on end to ensure that the tubes stay round during cooling. The tubes are desirably stood on end for a day or two to allow the tubular core material to crystallize for strength before the tubes are cut into individual paint rollers having a length for example of nine inches.

Although the invention has been shown and described with respect to a certain preferred embodiment, it is obvious that equivalent alterations and modifications will occur to others skilled in the art upon the reading and understanding of the specification. The present invention includes all such equivalent alterations and modifications, and is limited only by the scope of the claims.

What is claimed is:

1. A method of making roller covers comprising the steps of spirally wrapping a strip of hot thermoplastic film onto an exterior surface of hollow thermoplastic tubing, spirally wrapping a strip of fabric having a thermoplastic backing onto the spiral wound strip of thermoplastic film while the thermoplastic film is still sufficiently hot to cause the thermoplastic film to flow into interstices in the thermoplastic backing of the fabric and bond the fabric to the exterior surface of the tubing, cooling the fabric covered tubing, and cutting the fabric covered tubing into a plurality of individual roller covers.

2. A method of making roller covers comprising the steps of wrapping a strip of hot thermoplastic film onto an exterior surface of hollow thermoplastic tubing, wrapping a strip of fabric having a backing onto the thermoplastic film while the thermoplastic film is still sufficiently hot to cause the thermoplastic film to bond the fabric to the exterior surface of the tubing, cooling the fabric covered tubing, and separating the fabric covered tubing into a plurality of individual lengths of fabric covered tubes.

3. The method of claim 2 wherein a strip of thermoplastic film is continually extruded directly onto the tubing.

4. The method of claim 2 wherein tension is applied to the thermoplastic film as the thermoplastic film is wrapped onto the tubing to cause the thermoplastic film to draw down in width and thickness.

5. The method of claim 2 wherein the tubing is made of a polyolefin and the thermoplastic film is made of a polymer.

6. The method of claim 5 wherein the tubing is made of a polypropylene copolymer, the film is made of polypropylene, and the backing is made of a thermoplastic material.

7. The method of claim 2 wherein the fabric strip is spirally wrapped onto the tubing, further comprising the step of using a pressure roll to apply a preset pressure to a fabric seam formed between edges of the fabric strip where the fabric edges initially come together to ensure uniform adherence of the fabric to the tubing along the fabric seam.

8. The method of claim 7 further comprising the step of using additional pressure rolls to apply a preset pressure across substantially the entire width of the fabric strip after the fabric strip is spirally wrapped onto the tubing to ensure an even, uniform adherence of the fabric to the tubing over substantially the entire surface area of the tubing.

9. The method of claim 2 wherein the tubing comprises a plurality of individual tubes each having a length which is a multiple of the length of individual roller covers to be subsequently cut therefrom, further comprising the steps of butting the ends of the tubes together prior to wrapping the thermoplastic film and fabric material onto the tubing, and cutting through the fabric between the ends of the individual lengths of fabric covered tubes to separate the individual lengths of fabric covered tubes from each other.

10. The method of claim 9 further comprising the step of allowing the individual lengths of fabric covered tubes to completely cool and crystallize, and then cutting the individual fabric covered tubes into a plurality of individual roller covers.

11. The method of claim 2 wherein the thermoplastic film has a melt flow rate of between approximately 30 and 45 dg./min.

12. Apparatus for use in making paint roller covers comprising means for wrapping a strip of hot thermoplastic film onto an exterior surface of hollow thermoplastic tubing, means for wrapping a strip of fabric having a backing onto the thermoplastic film while the thermoplastic film is still sufficiently hot to cause the thermoplastic film to bond the fabric to the exterior surface of the tubing, means for cooling the fabric covered tubing, and means for separating the fabric covered tubing into a plurality of individual lengths of fabric covered tubes.

13. The apparatus of claim 12 wherein the tubing comprises a plurality of individual lengths of tubes, each having a length which is a multiple of the length of individual roller covers to be subsequently cut therefrom, said apparatus including means for bringing the ends of the tubes into abutting engagement with each other before the thermoplastic film and fabric are wrapped onto the tubing, said means for separating comprising a cutter assembly for cutting through the fabric between the ends of the individual tubes.

14. The apparatus of clam 3 further comprising means for actuating said cutter assembly to cut through the fabric every time a length of fabric covered tubing corresponding to the length of each individual tube is in alignment with said cutter assembly.

15. The apparatus of claim 2 further comprising a mandrel for supporting the tubing during wrapping of the thermoplastic film and fabric onto the tubing.

16. The apparatus of claim 15 wherein said mandrel includes a stepped portion having an outer diameter that more closely matches the inner diameter of the tubing than the remaining length of the mandrel for supporting the tubing during wrapping of the thermoplastic film and fabric onto the tubing.

17. The apparatus of claim 13 further comprising a mandrel for supporting the individual lengths of tubes in alignment with each other as the individual tubes are brought into abutting engagement with each other and hot thermoplastic film and fabric are wrapped around the tubing.

18. The apparatus of claim 17 further comprising a pair of axially spaced apart mandrel stops which sequentially engage and disengage said mandrel to permit individual lengths of tubes to be successively pushed onto said mandrel and advanced along the length of said mandrel while retaining said mandrel against axial movement.

19. The apparatus of claim 18 wherein said mandrel comprises a plurality of mandrel sections having ends rotatably connected together to permit relative rotation between mandrel sections, and universal drive assemblies are provided which engage the exterior surface of the tubing to drive the tubing both axially and rotationally along the length of said apparatus.

20. The apparatus of claim 19 further comprising a tube ram for pushing the individual lengths of tubes onto said mandrel when the upstream-most mandrel stop is disengaged and the downstream-most mandrel stop is engaged with the mandrel, a tube stripper for pushing the tubes further downstream of the downstream-most mandrel stop upon reengaging the upstream-most mandrel stop, and disengaging the downstream-most mandrel stop, and a metal detector for sensing axial movement of said mandrel downstream of where the bonding film and fabric are wrapped onto the tubing in the event the mandrel should become disengaged from both mandrel stops and move axially downstream and for automatically shutting the apparatus down in the event of such mandrel movement.

21. The apparatus of claim 12 wherein the fabric is spirally wrapped onto the tubing, further comprising a helical fabric guide extending approximately 360° around the tubing at the same helix angle as the fabric edges for picking up the fabric pile on the upstream side of the fabric as the fabric is spirally wrapped onto the tubing and terminating at the fabric seam where the edges of the fabric come together to prevent the fabric pile from getting caught between and underneath the fabric edges.

22. The apparatus of claim 12, wherein the fabric strip is spirally wrapped onto the tubing, further comprising a pressure roll for applying a preset pressure to the fabric seam where the fabric seam initially comes together as the fabric strip is spirally wrapped onto the tubing to ensure uniform adherence of the fabric to the tubing along the fabric seam.

23. The apparatus of claim 22 further comprising additional pressure rolls for applying a preset pressure across substantially the entire width of the fabric strip immediately after the fabric strip is spirally wrapped onto the tubing to ensure an even, uniform adherence of the fabric to the tubing over substantially the entire surface of the fabric.

* * * * *